Patented Apr. 22, 1952

2,593,817

UNITED STATES PATENT OFFICE 2,593,817

COLORED GLASS FIBER PRODUCT AND METHOD OF PRODUCING THE SAME

Jack H. Waggoner, Newark, Ohio, assignor to Owens-Corning Fiberglas Corporation, a corporation of Delaware No Drawing. Application June 1, 1949,
Serial No. 96,613

7 Claims. (Cl. 117—46)

This invention relates to glass fiber products and more particularly to colored glass fibers and to methods for producing the same.

Full utilization of glass fibers in textile fabrics and related structure has not been realized and cannot be realized until suitable means are provided for permanently coloring glass fibers independently of the melt from which the fibers are formed. Many of the difficulties in coloring glass fibers stem from the perfectly smooth and round surfaces the fiber has developed in forming. This characteristic coupled with the inertness of glass provides for little physical or chemical anchorage of coloring substances to the glass fiber surfaces.

There are some resinous materials which are adherent to glass fiber surfaces under normal conditions, which materials might function as a color receptive base, but in the presence of moisture or high humidity even these materials find little anchorage to the glass fiber surfaces. The failure of these resinous bases might be attributed to the hydrophilic characteristics that predominate on the glass fiber surfaces such that they preferentially attract water which forms as an intervening layer under high humidity conditions. Thus, coloring of glass fibers poses problems unlike those encountered in the coloring of natural organic fibers such as silk, wool, or cotton or synthetic fibers of the type rayon, nylon, vinyon, and the like.

It is an object of this invention to produce colored glass fibers and to provide a method for manufacturing the same.

Another object is to produce glass fibers that are permanently colored without interfering with other desirable characteristics of the fibers and it is a related object to produce colored glass fibers having in combination one or more improved properties, such as better hand and feel, draping qualities characteristic of the finest silks and woolens, increased abrasion resistance, resistance to slippage of the weave, and sheen or luster controlled to a desired degree.

A further object is to produce colored glass fibers and to provide a method for producing the same by treatment of the glass fibers and fabrics formed therefrom to deposit coloring particles strongly bonded to and in uniform distribution on the surfaces of the glass fibers.

A further object is to color glass fibers by a practical and economical method which may be adapted to conventional coloring techniques, such as roller printing as employed in the textile trade.

A still further object is to provide a method for treating glass fibers by forming substances firmly associated with the surfaces of the glass fibers and which functions as a receptive base for coloring agents or acts directly as a coloring agent and which in either case adds to the abrasion resistance, resistance to weave slippage and delusters the glass fibers in proportion to its concentration on the glass fiber surfaces.

To color glass fibers in accordance with this invention, I treat glass fibers in fabric form with a composition constituted with an organic compound, preferably a salt, of a metal having a desirable coloring oxide and an organo-silicon fluid in which the organic compound is soluble or compatible therewith in solvent solution.

I have found that the organo-silicon fluid upon thermal treatment at relatively high temperature on the glass fiber surfaces reacts in a manner to harden or set on the glass fiber surfaces and the glass fibers become substantially completely relaxed to improve the flexibility and "hand" of the fabric in a manner which has heretofore been difficult to achieve with fabrics manufactured of glass fibers. It is conceivable that the organo silicon compound thermally reacted in situ on the glass fiber surfaces forms a very desirable reaction product which may be controlled in amount and reaction to give varying degrees of flexibility ranging from starchy stiffness, such as is desired in curtains, to silky softness such as is desired in drapery cloth. Suppleness and crease or wrinkle resistance also becomes a characteristic of the fabric when the heat treatment is of the nature to weave-set the fibers in their twisted or woven relation. The combination of a reacted organo-silicon coating and weave-setting or fiber relaxation provides glass fibers with important new characteristics.

I have found that thermal reaction on the glass fiber surfaces of an organic compound or salt constituted with a metal having coloring oxides causes the removal of the organic component, leaving what is believed to be the corresponding metal oxide or a reaction product of the metal component on the glass fiber surfaces. By this thermal treatment, the coloring reaction products are deposited on the glass fiber surfaces in what appears to be colloidal form, but in such uniform distribution as to give the semblance of a continuous film. The coloring products might result from the reaction of the metallic salt or compound with groupings that predominate on the glass fiber surfaces to form the corresponding oxides or reaction products, or a reaction product may become so orientated with the glass fiber surfaces as to appear as a permanent part thereof to resist subsequent removal by forces incident to normal handling.

My invention contemplates the treatment of glass fibers with a combination of metallic salts compatible with the organo-silicon compounds to provide for a possible one-step treatment of the glass fibers wherein the heat required to cure or convert the organo-silicon compound is at the same time capable of causing the desired chemical rearrangement of the organic metallic compound to form coloring reaction products of a colloidal nature uniformly distributed all over the surfaces of the glass fibers or filaments.

The organo-silicon compound may be selected of materials commonly referred to as the polysiloxanes or silicones represented by the formula

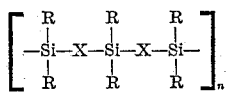

where R is a monovalent organic radical that is connected to silicon through carbon or through an intervening oxygen group of an alkoxy. Representative of suitable R groups are the organic radicals of the type aliphatic, alicyclic, aromatic or mixed aliphatic aromatic. For example, it may be methyl, ethyl, propyl, amyl, cyclopentyl, phenyl, benzyl, tolyl, naphthyls or mono-, di- or tri-ethyl phenyls. If aliphatic or mixed aliphatic aromatic, the aliphatic group may be branched or straight chained, saturated or unsaturated, and if cyclic, it may contain a hetero group, such as oxygen, nitrogen or sulphur. The R groups may also contain certain organic or inorganic substituents, such as amine groups, nitro groups, halogens and the like. X which represents the group connecting the silicon atoms is preferably oxygen, but may also be sulphur or a divalent organic radical of relatively short carbon length. Eventually each molecule is terminated with a blocking unit which is selected of the various R groups, and when terminated, the molecule may be considered to be fully reacted and stable with respect to heat, light and other activating conditions. Variations in properties are determined chiefly by the length or size of the molecular chain and the type of R groups with which the silicon atom is associated. The shorter the chain length, the more fluid the resulting compound.

In carrying out my invention, I prefer to employ as a component in the treating composition one of the organo-silicon fluids or oils which corresponds to the relatively short chained terminated polysiloxanes. Selection may rest further on the composition of the various R groups connected to the silicon atom. Representative of suitable organo-silicon fluids or oils are dimethyl polysiloxanes, diethyl polysiloxanes, and the like. When application to the glass fibers is made from dilute solvent solution, use may also be made of the higher molecular weight polysiloxanes having waxy, resinous or rubber-like characteristics, such as the copolymer of phenyl methyl polysiloxanes, the copolymer of dimethyl diphenyl polysiloxanes, and the like.

The compound or salt containing a metal having a coloring metal oxide is preferably selected of substances which are soluble in the organo-silicon or completely compatible with the organo-silicon when in solvent solution, thereby to enable their application together from a single composition. Suitable compounds are selected of the organo-metallic salts of the type metal naphthenates, metal benzoates, metal rosinates, metal octates, metal salts of aliphatic, aromatic and keto-aromatic acids, the metal fatty acid soaps and the like. Use may also be made of compounds wherein the metallic component is to be found in the anion such as in the stannates, molybdates, arsenates and arsenites, plumbates, chromates and the like. The metal component of desirable compounds may be selected of the polyvalent metals having coloring oxides, such as copper, chromium, cobalt, nickel, manganese, lead, uranium, iron, bismuth, vanadium, cadmium, silver, selenium, and the like. When coloring is not the primary goal, but abrasion resistance, bulking, anti-slip or delustering are important, the metal component may be of the type having substantially colorless oxides such as tin, zinc, titanium, zirconium, barium, aluminum, and the like. It has also been found that these same oxides or other reaction products which may be formed are highly receptive to organic dyes when thermally reacted on the glass fiber surfaces permitting anchorage of dyes or pigments by absorption or other physical forces.

As an example, the metal naphthenates are soluble in the organo silicon fluids and in common organic solvents of the type Stoddard solvents, solvesso solvents, coal tar solvents, and the like. Thus, the two substances; that is, the organo-metallic compound and the organo-silicon compound, may be combined in a single treating composition for application to the glass fibers. The metal naphthenates and other metal salts of aromatic acids are particularly suitable for use with glass fibers because they readily wet the glass fiber surfaces, even when sized with gelatins, starches or organo-silicon compounds and the like or from which the size is absent or has been removed, enabling application of the treating composition to glass fibers in the manner of a printing ink in the coloring of fabrics. Thus, the combination with metal naphthenates or corresponding salts of aromatic acids provides an excellent base for screen or roller printing on glass fibers; a process which has been difficult, if not impossible, to achieve with glass fiber fabrics.

Treatment to form the coloring reaction products of the metal salt and the organo-silicon compound may be carried out with staple or continuous glass fibers in filament, yarn or fabric form. Treatment may be achieved in conjunction with fiber forming process, or preferably by treatment of the fibers subsequent to their formation, such as after the fibers have been processed into yarns or cloth. As previously pointed out, it may be effected with sized fibers or with fibers from which the size has been removed by solvent or wash water or by heat treatment.

Compositions containing from 0.2 to 20 percent of the organo-metallic compound and from 1 to 5 percent of the organo-silicon compound in solvent solution may be used. A preferred composition contains 1–5 percent of the organo metallic compound and about 0.5–2 percent of the organo-silicon compound. To lower the cost and the danger of handling large volumes of solvents and their fumes and still secure the advantage of full impregnation by treatment from solvent solution, I have found that the substances may be dissolved one in another or in high concentration up to 50 and 70 percent in suitable organic solvent and then dispersed in water to reduce the concentration to the desired value. Treatment of the glass fibers or fabric may be made by methods common in the coating art, such as by roller coating, flow coating, dip coating, spraying, brushing, roller printing, screen printing, and the like. By these methods the entire fabric may be colored or coloring compositions may be applied to certain predetermined areas.

The maximum temperature for thermal reaction is limited only by the temperature at which the glass fibers fuse together, but it is preferably maintained below 800° F. The minimum temperature which it is advantageous to employ is about 600° F., but on occasion may go as low as 450° F. with correspondingly increased time of exposure. Exposure of 1 to 2 seconds is sufficient at 1200 to 1250° F., while at 600° F., 1 to 5 minutes may be required thermally to react the organo-silicon compound and to cause the desired rearrangement of the organo-metallic compound. It will be apparent that other time and temperature combinations may be employed within the temperature limitations prescribed to gain certain desirable effects. It will be further apparent that the color developed by the metal oxide or other reaction product will correspond more or less to the temperature employed, a phenomena comparable to that encountered by iron oxide color changes in the tempering of steel.

For example, exposure of fibers to 600° F. for 1 minute converts the fibers treated with nickel napthenate from an original greenish color to a blue-grey tinge. Other color gradations are possible at higher temperatures. Thus, it appears possible to color glass fibers by a practical process and then to convert all or parts thereof to another color by a simple heating operation. In order to gain greatest advantage of the organo-silicon component, it is desirable to use temperatures in excess of 600° F. so as to convert the organo-silicon to a desirable reaction product. It is believed that under the more severe temperature conditions, that is at temperature ranges from 800 to 1250° F., a certain amount of fiber relaxation is secured and the fibers become weave-set in their twisted or woven relation. While in this condition, the fibers and fabrics appear to have better feel, hand and drape, characteristics which are very desirable in textiles.

Delustering, bulking, and agents to impart resistance and weave slippage, resistance to abrasion and to provide a base for color coating by conventional means of an improved character may be secured by the simple expedient of employing additional organo-metallic salts that yield a substantially colorless flocculent or colloidal reaction product at the temperature of treatment. By the use of zinc sulphates, fluorescence may be secured. By the addition of colloidal silica or metal oxides to the treating composition, further bulking and delustering effect will be secured, and additional color of a permanent character will be derived if the metal oxides are coloring oxides of the type described.

It will be apparent that the product formed of uncolored reaction products developed in combination with baked organo-silicons may constitute an article of commerce subject to separate sale. It will be further apparent that numerous changes may be made in the selection of materials, their order of application to the glass fibers and the conditions under which the reaction is carried out without departing from the spirit of the invention, especially as defined in the following claims.

I claim:

1. The method of coloring glass fibers comprising the steps of coating the fibers with a polysiloxane and an organo metallic compound capable of producing a colored reaction product upon decomposition at elevated temperature while on the glass fiber surfaces and present in the ratio of 1–5 parts by weight polysiloxane to 0.2–20 parts by weight organo metallic compound, and heating the coated fibers under conditions ranging from 1–2 seconds at 1200–1250° F. to 1–5 minutes at 600° F. to set the polysiloxane on the glass fiber surfaces and to drive off the organic component of the organo metallic compound and form the colored reaction product on the glass fiber surfaces.

2. The method of coloring glass fibers comprising the steps of coating the fibers with a composition containing 1–5 percent by weight of a polysiloxane and 0.2–20 percent by weight of an organo metallic compound capable of producing a colored reaction product upon decomposition at elevated temperature while on the glass fiber surfaces, heating the coated fibers under conditions ranging from 1–2 seconds at a temperature slightly below fusion temperature for the glass composition of which the fibers are formed to 1–5 minutes at 600° F. to set the polysiloxane on the glass fiber surfaces and convert the organo metallic compound to a colored reaction product.

3. The method of coloring glass fibers comprising the steps of coating the fibers with a composition containing a polysiloxane and an organo metallic compound capable of producing a colored reaction product upon decomposition at elevated temperature while on the glass fiber surfaces and present in the ratio of 1–5 parts by weight polysiloxane to 0.2–20 parts by weight organo-metallic compound, exposing the coated fibers to a temperature within the range of 1200–1250° F. to 600° F., and maintaining the coated fibers under the conditions set forth until the polysiloxane is set on the glass fiber surfaces and the organic component of the organo metallic compound is driven off to leave the colored reaction product formed on the glass fiber surfaces.

4. The method of coloring glass fibers comprising the steps of coating the fibers with a composition containing 1–5 percent by weight of a polysiloxane and 0.2–20 percent by weight of an organo metallic compound capable of producing a colored reaction product upon decomposition at elevated temperature on the glass fiber surfaces, exposing the coated fibers to a temperature within the range of 600–800° F., and maintaining the heat treatment until the organo metallic compound is converted to a colored reaction product and the polysiloxane is set on the glass fiber surfaces.

5. The method of coloring glass fibers comprising the steps of coating the fibers with a composition containing 1–5 percent by weight of a polysiloxane, up to 20 percent by weight of a silicon oxide in colloidal form, and 0.2–20 percent by weight of an organo metallic compound capable of producing a colored reaction product upon decomposition at elevated temperature on the glass fiber surfaces, heating the coated fibers under conditions ranging from 1-2 seconds at a temperature slightly below the fusion temperature for the glass composition of which the fibers are formed to 1-5 minutes at 600° F. to set the polysiloxane on the glass fiber surfaces and decompose the organo metallic compound to form a colored reaction product on the glass fiber surfaces.

6. A colored glass fiber product produced by the method of claim 1.

7. A colored glass fiber product produced by the method of claim 5.

JACK H. WAGGONER.

REFERENCES CITED

The following references are of record in the file of this patent:

UNITED STATES PATENTS

| Number | Name | Date |
|---|---|---|
| 537,245 | Stock et al. | Apr. 9, 1895 |
| 2,258,218 | Rochow | Oct. 7, 1941 |
| 2,386,259 | Norton | Oct. 9, 1945 |
| 2,393,530 | Harris | Jan. 22, 1946 |
| 2,436,304 | Johannson | Feb. 17, 1948 |

FOREIGN PATENTS

| Number | Country | Date |
|---|---|---|
| 559,068 | Great Britain | Feb. 2, 1944 |